United States Patent
Adachi et al.

(10) Patent No.: US 10,640,090 B2
(45) Date of Patent: May 5, 2020

(54) OPTICAL DEVICE (71) Applicant: TOYOTA JIDOSHA KABUSHIKI KAISHA, Toyota-shi, Aichi-ken (JP)

(72) Inventors: Takahiro Adachi, Toyota (JP); Toshifumi Kawasaki, Miyoshi (JP); Yasutomo Morii, Toyota (JP); Takeki Mori, Nagoya (JP); Kazumi Chida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 15/895,075

(22) Filed: Feb. 13, 2018

(65) Prior Publication Data
US 2018/0229690 A1 Aug. 16, 2018

(30) Foreign Application Priority Data

Feb. 15, 2017 (JP) .................... 2017-026125

(51) Int. Cl.
- *B60H 1/00* (2006.01)
- *B60S 1/02* (2006.01)
- *B60S 1/54* (2006.01)
- *B60S 1/56* (2006.01)
- *B60S 1/08* (2006.01)

(52) U.S. Cl.
CPC ................. *B60S 1/023* (2013.01); *B60S 1/54* (2013.01); *B60S 1/56* (2013.01); *B60S 1/0848* (2013.01)

(58) Field of Classification Search
CPC .... B60H 1/00271; B60S 1/0848; B60S 1/023; G02B 2/0006; G11B 33/1453
USPC ................................... 454/75, 906
See application file for complete search history.

(56) References Cited

U.S. PATENT DOCUMENTS

2011/0233248 A1  9/2011 Flemming et al.

FOREIGN PATENT DOCUMENTS

| JP | 2002-040554 A | 2/2002 |
| JP | 2002-178885 A | 6/2002 |
| JP | 2004-025930 A | 1/2004 |
| JP | 2004-276857 A | 10/2004 |
| JP | 2008-148020 A | 6/2008 |
| JP | 2012-504518 A | 2/2012 |
| JP | 2012-228916 A | 11/2012 |
| JP | 2016-201719 A | 12/2016 |

*Primary Examiner* — Vivek K Shirsat
(74) *Attorney, Agent, or Firm* — Oliff PLC (57) ABSTRACT

An optical device includes an optical unit that is disposed with a closed space interposed between the optical unit and a windshield glass and is configured to acquire information of an outside of a vehicle cabin through the windshield glass, a heating unit that heats the closed space, an opening and closing unit that is disposed in an air flow path between the closed space and a vehicle cabin internal space and controls communication of air between the closed space and the vehicle cabin internal space, and a controller that controls an open and closed state of the opening and closing unit based on either an outside air temperature of a vehicle or a difference in humidity acquired by subtracting a humidity of the vehicle cabin internal space from a humidity of the closed space.

4 Claims, 6 Drawing Sheets

OPTICAL DEVICE

INCORPORATION BY REFERENCE

The disclosure of Japanese Patent Application No. 2017-026125 filed on Feb. 15, 2017 including the specification, drawings and abstract is incorporated herein by reference in its entirety.

BACKGROUND

1. Technical Field

The present disclosure relates to an optical device for mounting in a vehicle.

2. Description of Related Art

An optical system, for example, is known to acquire information about the situation in the front and the rear of a vehicle by using an optical device including a camera and the like, and use the information for assisting a driver in driving the vehicle. The optical system is typically disposed on a front or rear windshield glass inside a vehicle cabin.

In such an optical system, for example, when the outside air temperature of the vehicle is significantly lower than temperature inside the vehicle and causes the windshield glass in front of the camera of the optical device to be fogged due to the difference in temperature or the like between the inside and the outside of the vehicle, information of the outside of the vehicle cabin cannot be acquired by the camera, and the optical system may not be normally operated.

Thus, for example, heating means such as a heater for heating the windshield glass is disposed to suppress and remove the fog on the windshield glass as in a structure disclosed in Japanese Unexamined Patent Application Publication No.

SUMMARY

In a method of suppressing and removing fog on a windshield glass by using heating means, the defogging effect achieved by heating depends on the temperature and the humidity inside and outside a vehicle. Since such a point is not considered in the related art, it is desirable to improve the capability of defogging the windshield glass.

The present disclosure provides an optical device that can improve the capability of defogging a windshield glass by using heating means.

An aspect of the present disclosure relates to an optical device including an optical unit being to be disposed with a closed space interposed between the optical unit and a windshield glass and being configured to acquire information of an outside of a vehicle cabin through the windshield glass, a heating unit configured to heat the closed space, an opening and closing unit that is disposed in an air flow path between the closed space and a vehicle cabin internal space and is configured to control communication of air between the closed space and the vehicle cabin internal space, and a controller configured to control an open and closed state of the opening and closing unit based on either an outside air temperature of a vehicle or a difference in humidity acquired by subtracting a humidity of the vehicle cabin internal space from a humidity of the closed space. The controller is configured to set the opening and closing unit to an open state when the outside air temperature is higher than or equal to a predetermined temperature or when the difference in humidity is greater than or equal to a predetermined difference in humidity, and set the opening and closing unit to a closed state when the outside air temperature is lower than the predetermined temperature or when the difference in humidity is less than the predetermined difference in humidity.

In the optical device according to the aspect of the present disclosure, the opening and closing unit is disposed in the air flow path between the vehicle cabin internal space and the closed space in front of the optical unit. The open and closed state of the opening and closing unit is controlled based on either the outside air temperature or the difference in humidity. In the case of the outside air temperature, a determination as to whether or not fog on the glass in the closed space can be removed by merely heating of the heating unit is performed by comparing the outside air temperature with the predetermined temperature that is determined based on, for example, the dew point or the amount of saturated water vapor. In the case of the difference in humidity, a determination as to whether or not the fog on the glass in the closed space can be removed by merely heating of the heating unit is performed by comparing the difference in humidity with the predetermined difference in humidity that indicates that the closed space is more humid than the vehicle cabin internal space. When the outside air temperature is higher than or equal to the predetermined temperature, or when the difference in humidity is greater than or equal to the predetermined difference in humidity, the opening and closing unit is opened to open the air flow path between the closed space and the vehicle cabin internal space. When the outside air temperature is lower than the predetermined temperature, or when the difference in humidity is less than the predetermined difference in humidity, the opening and closing unit is closed to block the air flow path between the closed space and the vehicle cabin internal space.

In such control, when a determination that the closed space is in a state where the capability of defogging by heating of the heating unit is low can be made from the outside air temperature or the difference in humidity, it is possible to heat the windshield glass by the heating unit while causing dry air in the vehicle cabin internal space to easily enter the closed space. When a determination that the closed space is in a state where the capability of defogging by heating of the heating unit is high can be made from the outside air temperature or the difference in humidity, it is possible to heat the windshield glass by the heating unit while suppressing escape of the heat of the heating unit to the vehicle cabin internal space.

Accordingly, in an environment where the windshield glass is easily fogged, the capability of defogging the windshield glass in front of the optical unit can be improved regardless of the state of temperature or humidity inside and outside the vehicle.

The optical device according to the aspect of the present disclosure may further include a determination unit configured to determine whether or not the information of the outside of the vehicle cabin is acquired in the optical unit. The controller may be configured to control the open and closed state of the opening and closing unit when the determination unit determines that the information of the outside of the vehicle cabin is not acquired.

By such control, it is possible to perform operation of the opening and closing unit merely when the windshield glass is actually fogged. Accordingly, unneeded operation of the opening and closing unit is not performed when the windshield glass is not fogged, and it is possible to suppress ineffective consumption of electric power of a battery or the like.

In the optical device according to the aspect of the present disclosure, the controller may be configured to stop controlling the open and closed state of the opening and closing unit when the determination made by the determination unit that the information of the outside of the vehicle cabin is not acquired is not changed after elapse of a predetermined time period. In the optical device according to the aspect of the present disclosure, the controller may be configured to stop the heating unit from heating the closed space when the determination made by the determination unit that the information of the outside of the vehicle cabin is not acquired is not changed after elapse of a predetermined time period.

By such control, it is possible to stop the heating unit from heating or stop controlling the open and closed state of the opening and closing unit after the predetermined time period when the determination that the information of the outside of the vehicle cabin is not acquired in the optical unit is not changed even by continuing heating of the heating unit or control of the open and closed state of the opening and closing unit that is operated due to the determination. Accordingly, for example, when a fallen leaf or the like on the windshield glass is the cause of non-acquisition of the information of the outside of the vehicle cabin in the optical unit, it is possible to suppress ineffective consumption of electric power of the battery or the like caused by continuing heating or control of the open and closed state.

As described above, the optical device according to the aspect of the present disclosure can improve the capability of defogging a windshield glass by using heating means.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Summary

In an optical device according to one embodiment of the present disclosure, an opening and closing mechanism is disposed between the internal space of a vehicle cabin and a closed space in front of a camera that captures an image of the front of a vehicle. When a windshield glass in the closed space in front of the camera is fogged, the windshield glass is effectively defogged by controlling the open and closed state of the opening and closing mechanism based on the outside air temperature and the like of the vehicle.

Configuration of Optical Device

Figure 1:
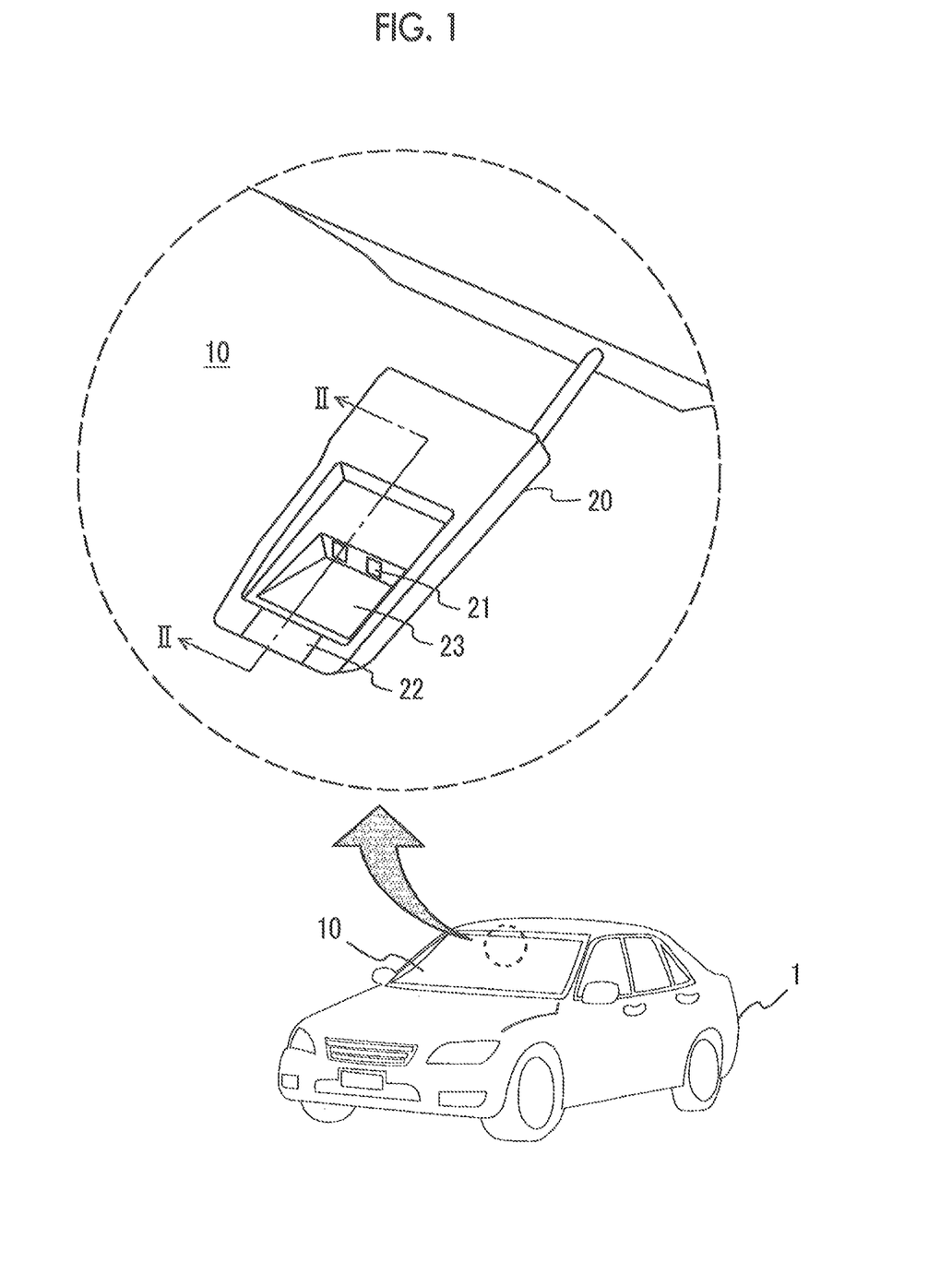
FIG. 1 is a schematic configuration diagram of an optical system in which an optical device according to one embodiment of the present disclosure is applied to a vehicle, and is an enlarged view of a main part of the optical system.
Figure 2:
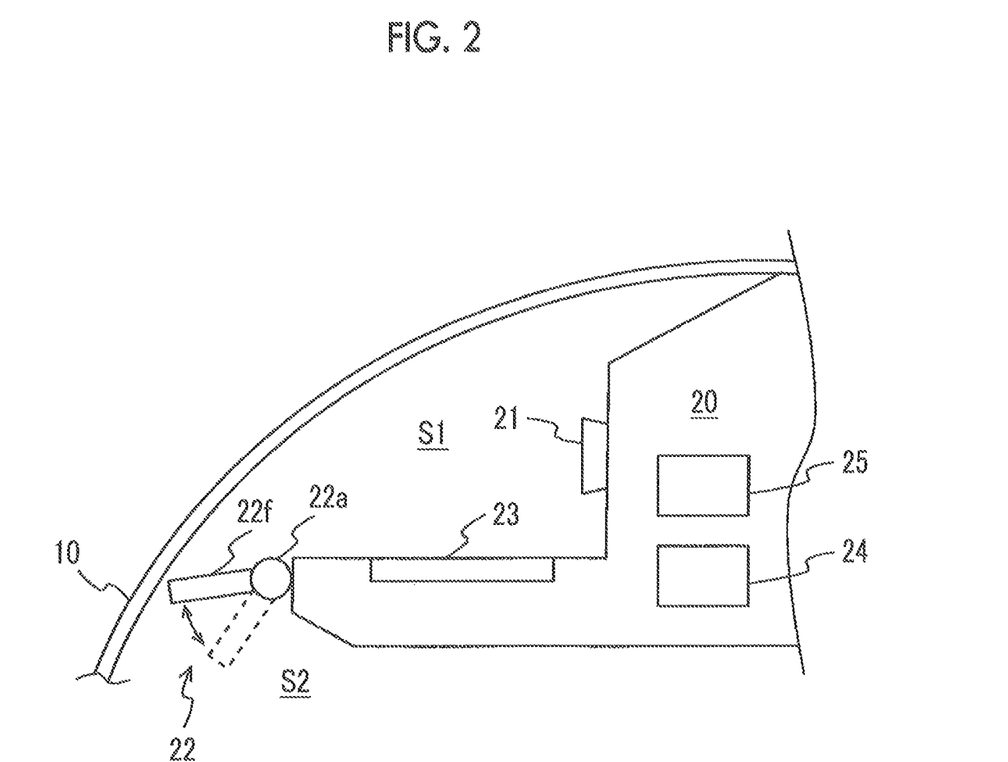
FIG. 2 is a sectional view taken along line II-II in the enlarged view of the main part illustrated in FIG. 1.

FIG. 1 is a diagram describing a schematic configuration of an optical system in which an optical device 20 according to one embodiment of the present disclosure is applied to a vehicle 1, and is an enlarged view of a main part of the optical system. FIG. 2 is a sectional side view taken along line II-II in the enlarged view of the main part illustrated in FIG. 1.

A windshield glass 10 is a transparent glass member that transmits visible light. While the windshield glass 10 described in the present embodiment is a glass on the front side of the vehicle 1, the windshield glass 10 may be a rear window or a side window (window glass).

The optical device 20 is disposed inside a vehicle cabin with a predetermined closed space S1 interposed between the optical device 20 and the windshield glass 10. The closed space S1 does not need to be airtight and, for example, may have a gap through which air in the closed space S1 does not actively communicate with air in the space outside the closed space S1 (hereinafter, referred to as a "vehicle cabin internal space S2").

The optical device 20 according to the present embodiment includes an optical unit 21, an opening and closing unit 22, a heating unit 23, a controller 24, and a determination unit 25.

The optical unit 21 is optical system means for acquiring information of the outside of the vehicle cabin of the vehicle 1. The optical unit 21 uses a camera for capturing an image around the vehicle, and/or a laser sensor or the like for detecting an object that is present around the vehicle. The optical unit 21 is disposed to be capable of acquiring the information of the outside of the vehicle cabin of the vehicle 1, more specifically, an image and/or an object in front of the vehicle, through the windshield glass 10.

The opening and closing unit 22 is opening and closing means for shielding the closed space S1 from the vehicle cabin internal space S2 or opening the closed space S1 to the vehicle cabin internal space S2. For example, the opening and closing unit 22 includes a pivot shaft 22a extending in the width direction of the vehicle, and a flap 22f having an approximately rectangular plate shape. The opening and closing unit 22 is disposed to be pivotable in an air flow path between the closed space S1 and the vehicle cabin internal space S2.

The flap 22f is supported by the pivot shaft 22a to be pivotable about the pivot shaft 22a in the upward or downward direction of the vehicle. The flap 22f is controlled to be in either a closed state (a position illustrated by a solid line in FIG. 2) or an open state (a position illustrated by a broken line in FIG. 2) by operating an actuator mechanism, not illustrated, in accordance with an instruction from the controller 24 described below. In the closed state, the flap 22f does not provide communication between air in the closed space S1 and air in the vehicle cabin internal space S2. In the open state, the flap 22f provides communication between air in the closed space S1 and air in the vehicle cabin internal space S2.

The heating unit 23 is heating means such as a heater for generating heat by conduction. The heating unit 23 is disposed to be capable of heating the closed space S1. While FIG. 1 and FIG. 2 illustrate the heating unit 23 as being incorporated in the main body of the optical device 20, the heating unit 23 may be, for example, a heater having a sheet shape that is bonded to the windshield glass 10.

The controller 24 is means for controlling the open and closed state of the opening and closing unit 22. Such control is performed based on either the outside air temperature of the vehicle 1 or a difference in humidity between the closed space S1 and the vehicle cabin internal space S2, more specifically, a difference in humidity acquired by subtracting the humidity of the vehicle cabin internal space S2 from the humidity of the closed space S1. For example, a value that is measured by an outside air temperature sensor (not illustrated) disposed outside the vehicle can be used as the outside air temperature of the vehicle 1. For example, a value that is measured by a humidity sensor (not illustrated) disposed in the closed space S1, and a value that is measured by a humidity sensor (not illustrated) disposed in the vehicle cabin internal space S2 can be used for the difference in humidity between the closed space S1 and the vehicle cabin internal space S2. Each sensor can be set to any position.

The determination unit 25 is means for determining whether or not the information of the outside of the vehicle cabin is acquired in the optical unit 21. The determination unit 25 is configured to be capable of analyzing information acquired by the optical unit 21 and determining whether or not the information of the outside of the vehicle cabin is acquired. An obstacle that is the cause of non-acquisition of the information of the outside of the vehicle cabin is typically fog on the inner surface of the windshield glass 10 that is generated in the range of angle of view of the optical unit 21. The obstacle may also be a fallen leaf or a physical stain such as bird droppings on the outer surface of the windshield glass 10. The information of the outside of the vehicle cabin is acquired means that a picture of the outside of the vehicle cabin is clearly acquired.

Examples of Defogging Control

First Example

Figure 3:
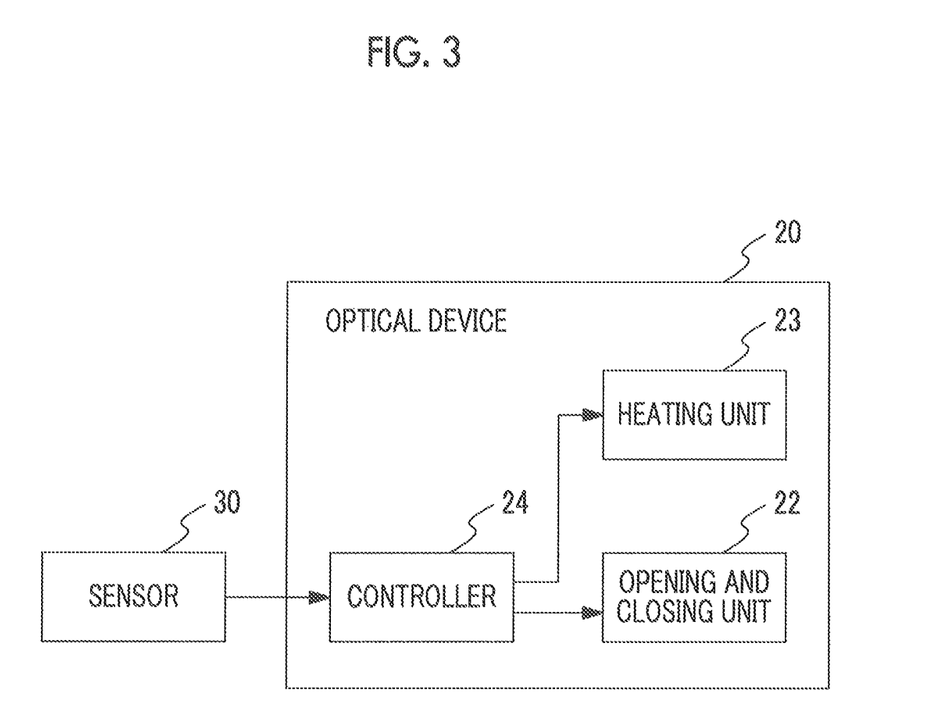
FIG. 3 is a diagram illustrating a configuration of the optical device for defogging control according to a first example.
Figure 4:
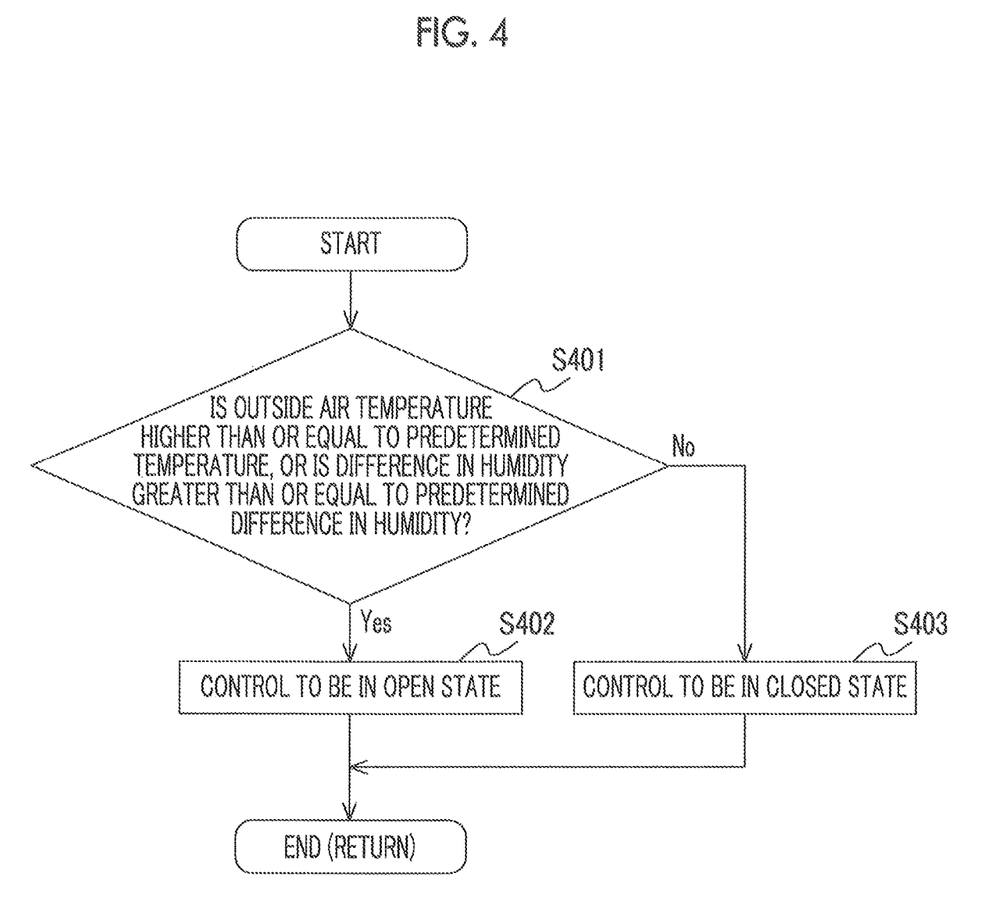
FIG. 4 is a flowchart describing a process procedure of the defogging control according to the first example.

A first example of defogging control that is performed by the optical device 20 according to one embodiment of the present disclosure will be described with reference to FIG. 3 and FIG. 4. FIG. 3 is a diagram illustrating a configuration of the optical device 20 for the defogging control according to the first example. FIG. 4 is a flowchart describing a process procedure performed by the controller 24 for the defogging control according to the first example.

The defogging control according to the first example illustrated in FIG. 4 can be executed by using the configurations of the opening and closing unit 22, the heating unit 23, and the controller 24 included in the optical device 20, and a sensor 30 mounted in the vehicle 1. For example, the defogging control according to the first example is started when the optical system is started by switching a power supply ON, and is repeatedly executed at predetermined cycles until the optical system is stopped by switching the power supply OFF.

In the first example, the heating unit 23 starts heating the closed space S1 at the same time as the start of the optical system, and stops heating the closed space S1 at the same time as the stoppage of the optical system.

Step S401: In the process of step S401, either the outside air temperature of the vehicle 1 or the difference in humidity between the closed space S1 and the vehicle cabin internal space S2 is acquired from the sensor 30. A determination as to whether or not the outside air temperature is higher than or equal to a predetermined temperature, or whether or not the difference in humidity is greater than or equal to a predetermined difference in humidity is performed. When a determination is made that the outside air temperature is higher than or equal to the predetermined temperature, or that the difference in humidity is greater than or equal to the predetermined difference in humidity (Yes in S401), the process transitions to step S402. When a determination is made that the outside air temperature is lower than the predetermined temperature, or that the difference in humidity is less than the predetermined difference in humidity (No in S401), the process transitions to step S403.

Step S402: In the process of step S402, a determination is made that the closed space S1 is in a state where the capability of defogging by heating of the heating unit is low, and the opening and closing unit 22 is controlled to be in an open state. Such control sets a state where air in the closed space S1 can communicate with air in the vehicle cabin internal space S2. When the opening and closing unit 22 is controlled to be in an open state, one cycle of the process of the defogging control is finished, and the process returns to step S401.

Step S403: In the process of step S403, a determination is made that the closed space S1 is in a state where the capability of defogging by heating of the heating unit is high, and the opening and closing unit 22 is controlled to be in a closed state. Such control sets a state where air in the closed space S cannot communicate with air in the vehicle cabin internal space S2. When the opening and closing unit 22 is controlled to be in a closed state, one cycle of the process of the defogging control is finished, and the process returns to step S401.

In the first example of the defogging control, when a determination can be made that the closed space S is in a state where the capability of defogging is comparatively low, it is possible to suppress and remove the fog on the windshield glass 10 by the heat of the heating unit 23 while causing dry air in the vehicle cabin internal space S2 to easily enter the closed space S1. When a determination can be made that the closed space S1 is in a state where the capability of defogging is comparatively high, it is possible to suppress and remove the fog on the windshield glass 10 by merely the heat of the heating unit 23 while suppressing escape of the heat of the heating unit 23 to the vehicle cabin internal space S2.

In the first example, the heating unit 23 starts heating the closed space S1 at the same time as the start of the optical system, and stops heating the closed space S1 at the same time as the stoppage of the optical system. However, the heating unit 23 may stop heating the closed space S1 during the period in which the opening and closing unit 22 is controlled to be in an open state. That is, since the fog on the windshield glass 10 can be expected to be suppressed and removed by causing dry air in the vehicle cabin internal space S2 to flow into the closed space S1, the heating unit 23 may stop heating the closed space S1 during the period in which the opening and closing unit 22 is controlled to be in an open state.

Second Example

Figure 5:
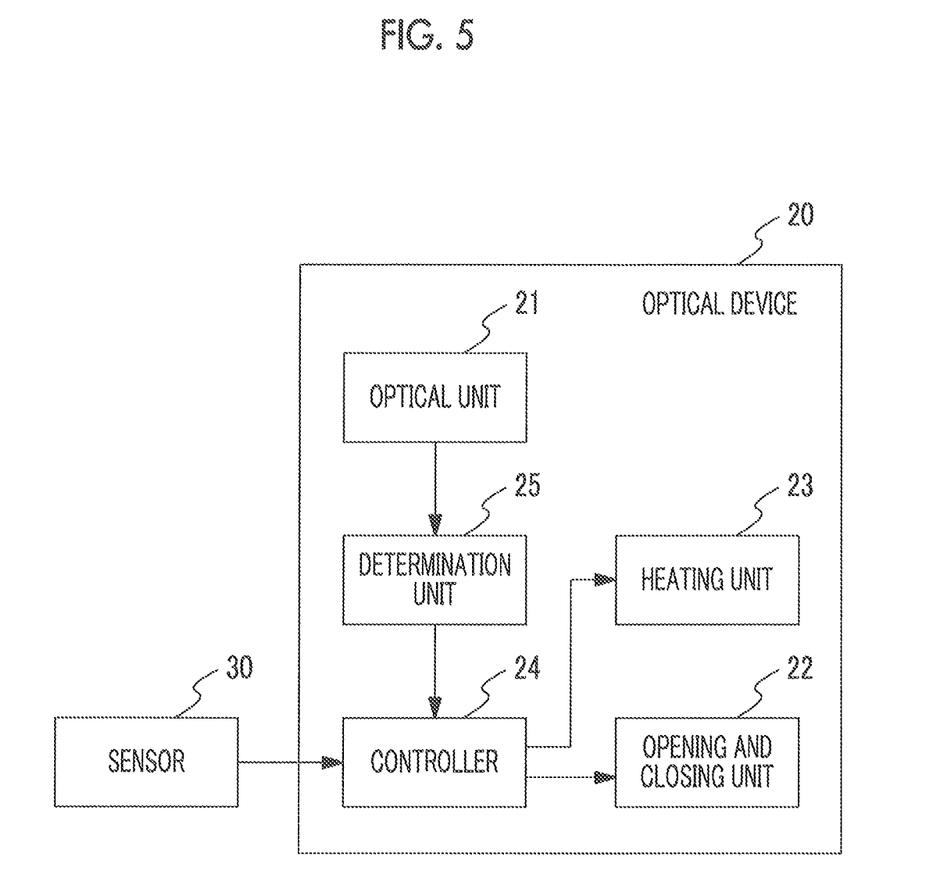
FIG. 5 is a diagram illustrating a configuration of the optical device for defogging control according to a second example.
Figure 6:
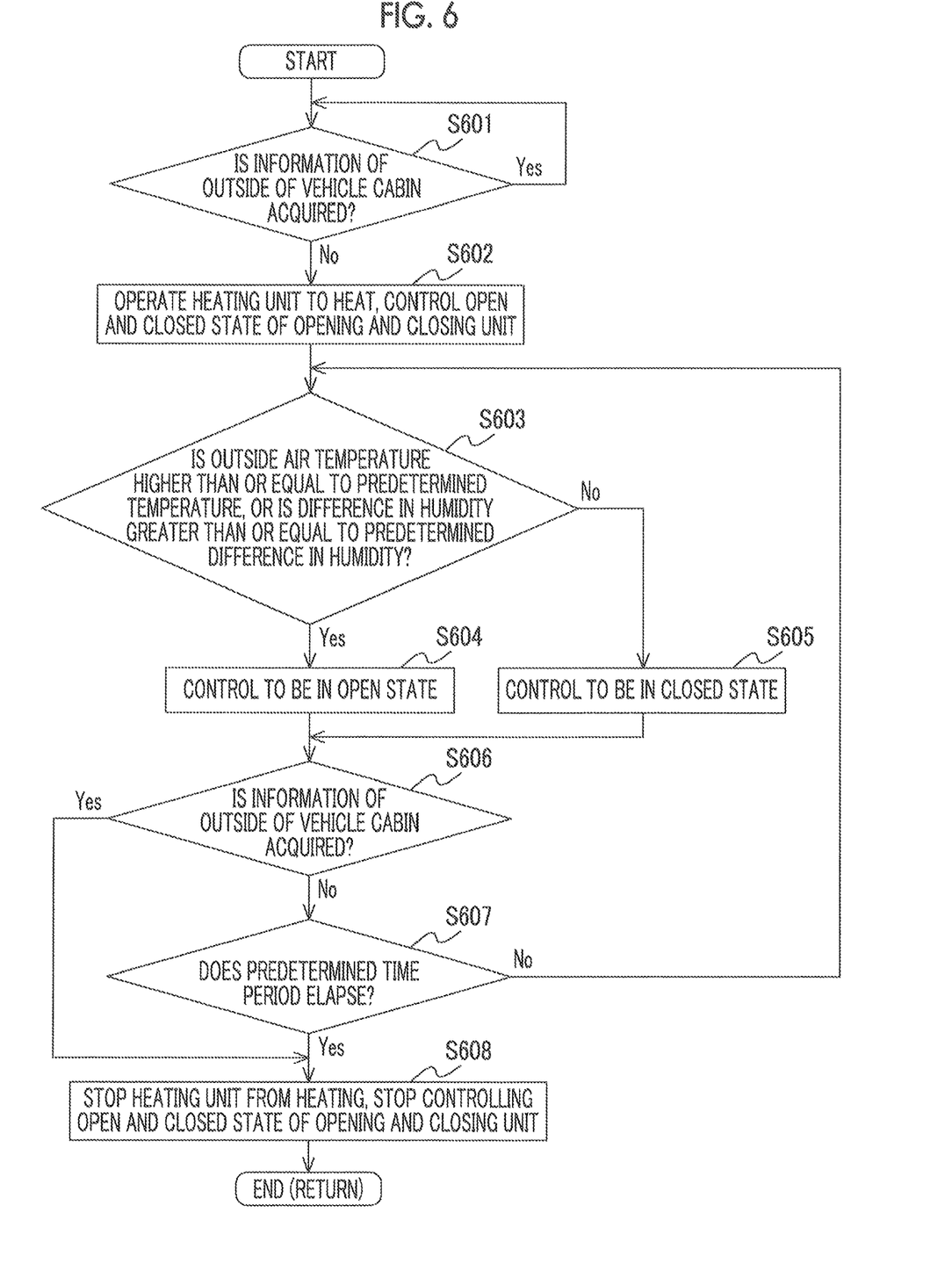
FIG. 6 is a flowchart describing a process procedure of the defogging control according to the second example.

A second example of the defogging control that is performed by the optical device 20 according to one embodiment of the present disclosure will be described with reference to FIG. 5 and FIG. 6. FIG. 5 is a diagram illustrating a configuration of the optical device 20 for the defogging control according to the second example. FIG. 6 is a flowchart describing a process procedure performed by the controller 24 and the determination unit 25 for the defogging control according to the second example.

The defogging control according to the second example illustrated in FIG. 6 can be executed by using the configurations of the optical unit 21, the opening and closing unit 22, the heating unit 23, the controller 24, and the determination unit 25 included in the optical device 20, and the sensor 30 mounted in the vehicle 1. For example, the defogging control according to the second example is started when the optical system is started by switching the power supply ON, and is repeatedly executed at predetermined cycles until the optical system is stopped by switching the power supply OFF.

In the second example, the heating unit 23 does not heat the closed space S1 even when the optical system is started.

Step S601: In the process of step S601, the determination unit 25 acquires information acquired by the optical unit 21 from the optical unit 21. The determination unit 25 analyzes the acquired information and determines whether or not the information of the outside of the vehicle cabin is acquired. When the determination unit 25 determines that the information of the outside of the vehicle cabin is not acquired (No in S601), the process transitions to step S602. When the determination unit 25 determines that the information of the outside of the vehicle cabin is acquired (Yes in S601), the process of step S601 is executed again.

Step S602: In the process of step S602, the controller 24 operates the heating unit 23 to heat the closed space S1 and controls the open and closed state of the opening and closing unit 22. When the controller 24 operates heating and controls the open and closed state, the process transitions to step S603.

Step S603: In the process of step S603, the controller 24 acquires either the outside air temperature of the vehicle 1 or the difference in humidity between the closed space S1 and the vehicle cabin internal space S2 from the sensor 30. The controller 24 determines whether or not the outside air temperature is higher than or equal to the predetermined temperature, or whether or not the difference in humidity is greater than or equal to the predetermined difference in humidity. When the controller 24 determines that the outside air temperature is higher than or equal to the predetermined temperature, or that the difference in humidity is greater than or equal to the predetermined difference in humidity (Yes in S603), the process transitions to step S604. When the controller 24 determines that the outside air temperature is lower than the predetermined temperature, or that the difference in humidity is less than the predetermined difference in humidity (No in S603), the process transitions to step S605.

Step S604: In the process of step S604, a determination is made that the closed space S1 is in a state where the capability of defogging by heating of the heating unit is low, and the controller 24 controls the opening and closing unit 22 to be in an open state. Such control sets a state where air in the closed space S1 can communicate with air in the vehicle cabin internal space S2. When the opening and closing unit 22 is controlled to be in an open state, the process transitions to step S606.

Step S605: In the process of step S605, a determination is made that the closed space S1 is in a state where the capability of defogging by heating of the heating unit is high, and the controller 24 controls the opening and closing unit 22 to be in a closed state. Such control sets a state where air in the closed space S1 cannot communicate with air in the vehicle cabin internal space S2. When the opening and closing unit 22 is controlled to be in a closed state, the process transitions to step S606.

Step S606: In the process of step S606, the determination unit 25 acquires information acquired by the optical unit 21 from the optical unit 21 in the same manner as in step S601. The determination unit 25 analyzes the acquired image and determines again whether or not the information of the outside of the vehicle cabin is acquired. When the determination unit 25 determines that the information of the outside of the vehicle cabin is not acquired (No in S606), the process transitions to step S607. When the determination unit 25 determines that the information of the outside of the vehicle cabin is acquired (that is, the obstacle that is present is removed) (Yes in S606), the process transitions to step S608.

Step S607: In the process of step S607, the controller 24 determines whether or not a predetermined time period elapses from the operation of heating and control of the open and closed state in step S602. While the predetermined time period may be set to any time period, the predetermined time period can be set to, for example, a time period in which the windshield glass 10 is expected to be defogged when being heated by the heating unit 23, or a time period in which the windshield glass 10 is expected to be defogged when being exposed to dry air by controlling the opening and closing unit 22 to be in an open state.

In step S607, when the controller 24 determines that the predetermined time period does not elapse (No in S607), the process returns to step S603. When the controller 24 determines that the predetermined time period elapses (Yes in S607), the process transitions to step S608.

Step S608: In the process of step S608, the controller 24 stops the heating unit 23 from heating the closed space S1 and stops controlling the open and closed state of the opening and closing unit 22. When the controller 24 stops heating and controlling the open and closed state, one cycle of the process of the defogging control is finished, and the process returns to step S601.

In the second example of the defogging control, when the fog or the like actually occurs on the windshield glass 10, and a determination can be made that the closed space S1 is in a state where the capability of defogging is comparatively low, the fog on the windshield glass 10 can be removed by the heat of the heating unit 23 and by causing dry air in the vehicle cabin internal space S2 to easily enter the closed space S1. When the fog or the like actually occurs on the windshield glass 10, and a determination can be made that the closed space S is in a state where the capability of defogging is comparatively high, the fog on the windshield glass 10 can be removed by merely the heat of the heating unit 23 and by suppressing escape of the heat of the heating unit 23 to the vehicle cabin internal space S2.

In the second example of the defogging control, control performed by the opening and closing unit 22 and the heating unit 23 is stopped when the windshield glass 10 is not defogged after elapse of the predetermined time period from the start of defogging of the windshield glass 10. Accordingly, for example, in a situation where the optical unit 21 cannot acquire the information of the outside of the vehicle cabin due to a cause other than the fog on the windshield glass 10, it is possible to suppress ineffective consumption of electric power of a battery or the like caused by continuing the operation that is not expected to resolve the situation.

While, in the second example of the defogging control, the controller 24 stops the heating unit 23 from heating the closed space S1 and also stops controlling the open and closed state of the opening and closing unit 22 after elapse of the predetermined time period (step S608), the controller 24 may either stop the heating unit 23 from heating the closed space S1 or stop controlling the open and closed state of the opening and closing unit 22.

In the second example of the defogging control, the controller 24 determines elapse of the same time period (step S607), and the controller 24 stops the heating unit 23 from heating the closed space S1 and stops controlling the open and closed state of the opening and closing unit 22 (step S608). However, the controller 24 may stop the heating unit 23 from heating the closed space S1 and stop controlling the open and closed state of the opening and closing unit 22 at different timings by determining elapse of different time periods.

Effect of Present Embodiment

As described above, in the optical device 20 according to one embodiment of the present disclosure, the opening and closing unit 22 is disposed in the air flow path between the vehicle cabin internal space S2 and the closed space S1 that is present in front of the optical unit 21. The open and closed state of the opening and closing unit 22 is controlled by determining whether the outside air temperature of the vehicle 1 acquired from the sensor 30 is higher or lower than the predetermined temperature. When the outside air temperature is higher than or equal to the predetermined temperature, the opening and closing unit 22 is controlled to be in an open state, and the air flow path between the closed space S1 and the vehicle cabin internal space S2 is opened. When the outside air temperature is lower than the predetermined temperature, the opening and closing unit 22 is controlled to be in a closed state, and the air flow path between the closed space S1 and the vehicle cabin internal space S2 is blocked.

The optical device 20 according to the present embodiment can also control the open and closed state of the opening and closing unit 22 by determining whether the difference in humidity acquired by subtracting the humidity of the vehicle cabin internal space S2 from the humidity of the closed space S1 is greater or less than the predetermined difference in humidity, instead of the outside air temperature of the vehicle 1. In such a case, when the difference in humidity is greater than or equal to the predetermined difference in humidity, the opening and closing unit 22 is controlled to be in an open state, and the air flow path between the closed space S1 and the vehicle cabin internal space S2 is opened. When the difference in humidity is less than the predetermined difference in humidity, the opening and closing unit 22 is controlled to be in a closed state, and the air flow path between the closed space S1 and the vehicle cabin internal space S2 is blocked.

When a determination that the closed space S1 is in a state where the capability of defogging by heating of the heating unit 23 is low can be made by such control, it is possible to heat the windshield glass 10 by the heating unit 23 while, for example, exposing the windshield glass 10 in the closed space S1 to dry air in the vehicle cabin internal space S2 that is caused to easily enter the closed space S1. Thus, the windshield glass 10 can be effectively defogged. When a determination can be made that the closed space S1 is in a state where the capability of defogging by heating of the heating unit 23 is high, it is possible to heat the windshield glass 10 by the heating unit 23 by, for example, confining the heat of the heating unit 23 within the closed space S1 while suppressing an increase in the amount of water vapor in the closed space S1 due to flow of humid air in the vehicle cabin internal space S2 to the closed space S. Thus, the windshield glass 10 can be effectively defogged.

Accordingly, in an environment where the windshield glass 10 is easily fogged, the capability of defogging to suppress and remove the fog on the windshield glass 10 in front of the optical unit 21 can be improved regardless of the state of temperature or humidity inside and outside the vehicle.

The optical device 20 according to the present embodiment can further include the determination unit 25 that determines whether or not the information of the outside of the vehicle cabin is acquired in the optical unit 21. By such a configuration, the controller 24 can operate the heating unit 23 to heat the closed space S1 and can control the open and closed state of the opening and closing unit 22 when the determination unit 25 determines that the information of the outside of the vehicle cabin is not acquired.

By such control, it is possible to perform either heating the closed space S1 by operating the heating unit 23 or changing the open state or the closed state of the opening and closing unit 22 to the closed state or the open state by operating the opening and closing unit 22 merely when the windshield glass 10 in front of the optical unit 21 is actually fogged. Accordingly, unneeded heating and control of the open and closed state can be avoided when the windshield glass 10 is not fogged, and it is possible to suppress ineffective consumption of electric power of the battery or the like of the vehicle 1.

In the optical device 20 according to the present embodiment, controlling the open and closed state of the opening and closing unit 22 and/or heating the closed space S1 by the heating unit 23 may be stopped when the determination unit 25 determines that the information of the outside of the vehicle cabin is not acquired even after elapse of the predetermined time period after the controller 24 controls the open and closed state of the opening and closing unit 22 or operates the heating unit 23 to heat the closed space S1.

By such control, it is possible to stop the heating unit 23 from heating or stop controlling the open and closed state of the opening and closing unit 22 after the predetermined time period when the information of the outside of the vehicle cabin cannot be acquired even by continuing heating of the heating unit 23 or control of the open and closed state of the opening and closing unit 22 that is operated due to non-acquisition of the information of the outside of the vehicle cabin. Accordingly, for example, when the obstacle causing non-acquisition of the information of the outside of the vehicle cabin is a fallen leaf or the like on the windshield glass 10 instead of the fog on the windshield glass 10, it is possible to suppress ineffective consumption of electric power of the battery or the like of the vehicle 1 caused by continuing the operation of heating or control of the open and closed state that is not expected to resolve the situation.

While the present disclosure is described in detail heretofore, such description is merely an illustration of the present disclosure from every point and does not limit the scope of the present disclosure. Various improvements or modifications can be made.

The optical device of the present disclosure can be used in an optical system mounted in a vehicle, and is useful when, for example, it is desirable to improve the capability of defogging a windshield glass by using heating means.

What is claimed is:

1. An optical device comprising:
an optical apparatus configured to acquire information regarding an outside of a vehicle cabin through a windshield glass, where a closed space of the optical device is located between the optical apparatus and the windshield glass;

a heater configured to heat the closed space;

an opening and closing vent disposed in an air flow path between the closed space and a vehicle cabin internal space, the opening and closing vent being configured to control communication of air between the closed space and the vehicle cabin internal space; and a controller configured to control an open and closed state of the opening and closing vent based on a difference in a value of a humidity acquired by subtracting a humidity of the vehicle cabin internal space from a humidity of the closed space, wherein:

when the difference in humidity is greater than or equal to a predetermined difference in humidity, the heater heats the closed space and the controller is configured to set the opening and closing vent to the open state, and when the difference in humidity is less than the predetermined difference in humidity, the heater heats the closed space and the controller is configured to set the opening and closing vent to a closed state.

2. The optical device according to claim 1, further comprising a determination processor configured to determine whether or not the optical apparatus acquires the information regarding the outside of the vehicle cabin, wherein the controller is configured to control the open and closed state of the opening and closing vent when the determination processor determines that the information regarding the outside of the vehicle cabin cannot be acquired by the optical apparatus.

3. The optical device according to claim 2, wherein the controller is configured to stop controlling the open and closed state of the opening and closing vent when the determination made by the determination processor, which determines that the information regarding the outside of the vehicle cabin cannot be acquired, is not changed after elapse of a predetermined time period.

4. The optical device according to claim 2, wherein the controller is configured to stop the heater from heating the closed space when the determination made by the determination processor, which determines that the information regarding the outside of the vehicle cabin cannot be acquired, is not changed after elapse of a predetermined time period.

* * * * *